May 7, 1963  A. J. HANSSEN  3,088,485
LIQUID LEVEL CONTROL APPARATUS
Original Filed Jan. 20, 1955  2 Sheets-Sheet 1
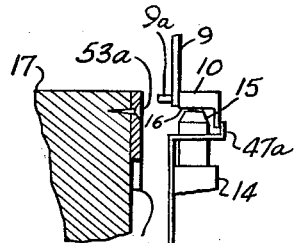
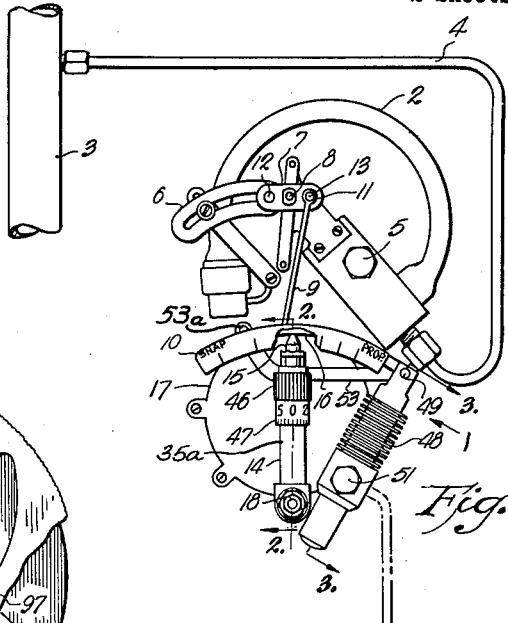
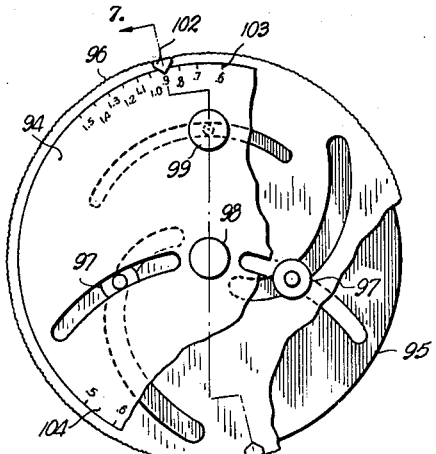
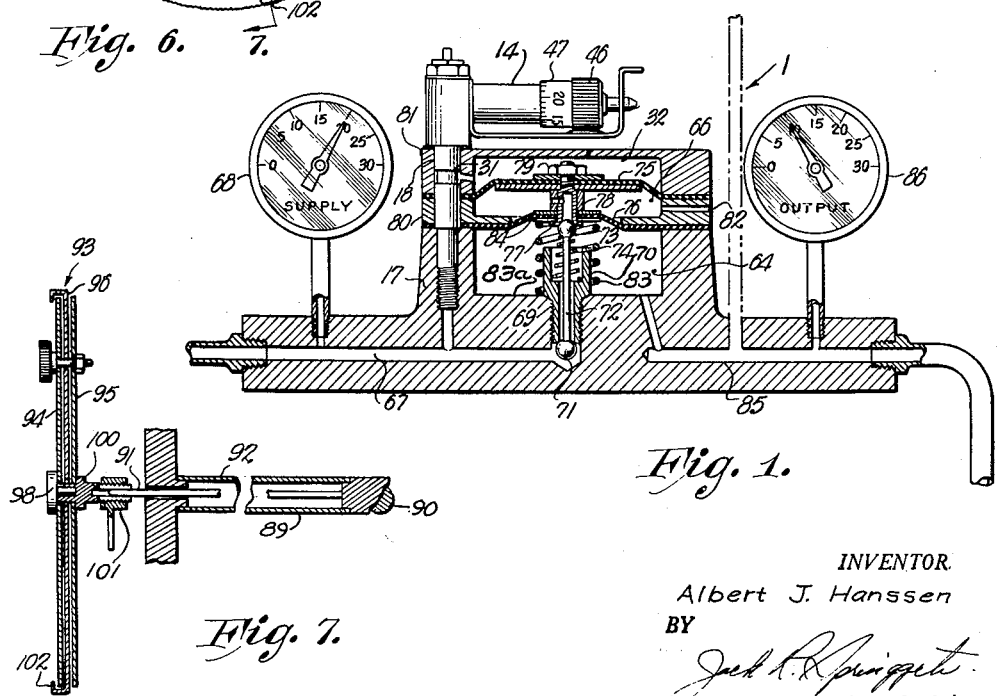
INVENTOR.
Albert J. Hanssen
BY
ATTORNEY.

INVENTOR.
Albert J. Hanssen

United States Patent Office 3,088,485
Patented May 7, 1963

3,088,485
LIQUID LEVEL CONTROL APPARATUS
Albert J. Hanssen, Glenside, Pa., assignor to Black, Sivalls & Bryson, Inc., Kansas City, Mo., a corporation of Delaware
Original application Jan. 20, 1955, Ser. No. 483,154, now Patent No. 2,984,260, dated May 16, 1961. Divided and this application June 20, 1960, Ser. No. 37,226
8 Claims. (Cl. 137—413)

This invention relates to new and useful improvements in control devices and more specifically to improvements in devices for controlling valves and to improvement of the components of such devices.

The primary object of the present invention is to provide a device for controlling valves which will operate as a pressure controller, a temperature controller, a flow controller and a liquid level controller merely by substituting a motion transmitting device responsive to the desired control media. Thus, this device is a multi-purpose controller being adaptable for use on any of the aforementioned control applications and requiring simply the exchange of motion transmitting device and a connection between said motion transmitting device and the media to be controlled. The device of the present invention is also adaptable to any control application wherein the media can be controlled by a valve and the characteristics to be controlled can be translated into a motion.

Other objects of the present invention are to provide a device for controlling valves having external means for ejecting deleterious material from the feed orifice; to provide a control device having improved spring loaded bellows with overtravel protection; to provide a control device having an easily reversible pilot action; and to provide a liquid level control device having an improved gravity setting mechanism.

In accomplishing these and other objects of the invention, I have provided improved details of structure, the preferred form of which is illustrated in the accompanying drawings wherein:

FIG. 1 is a partial schematic sectional view of a pressure controller constructed in accordance with the present invention.

FIG. 6 is a partially broken view of the motion transmitting mechanism used with the liquid level controller shown in FIG. 5.

FIG. 7 is a partial sectional view of the motion transmitting mechanism taken along lines 7—7 in FIG. 6.

FIG. 8 is an enlarged partial sectional view similar to FIG. 2 illustrating the relationship between the bleed nozzle and the curved piece.

FIG. 9 is a partial plan view of the apparatus.

Figure 2:
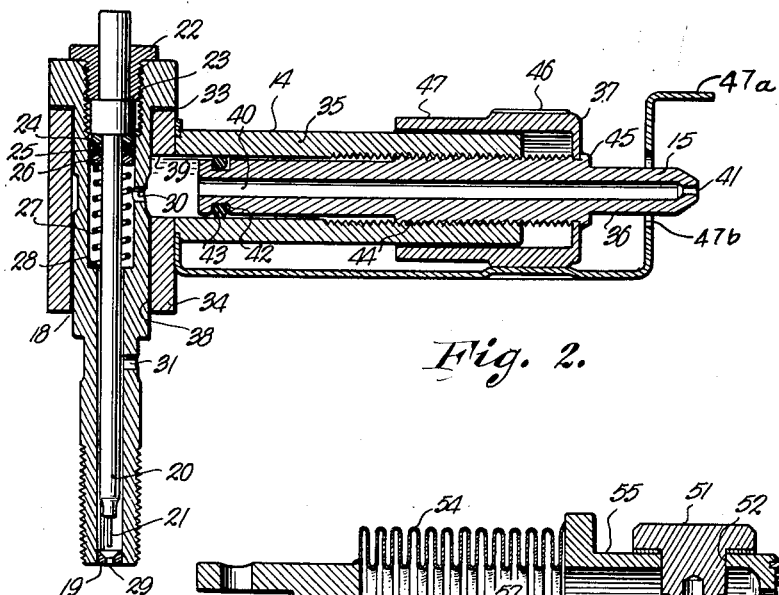
FIG. 2 is a sectional view of a bleed nozzle and pilot orifice taken along lines 2—2 in FIG. 9.

Referring more in detail to the drawings:

FIGS. 1 and 9 illustrate a control device of the present invention operating as a pressure controller 1 and utilizing a Bourdon tube 2 to obtain the movement responsive to the pressure to be controlled. Pressure from the pipe 3 which is to be controlled is transmitted to the Bourdon tube 2 through the duct 4. The inlet end of the Bourdon tube 2 is fixed to a housing (not shown) by a mounting screw 5 and the closed end is connected to a linkage 6 which transmits the motion of the Bourdon tube 2 into a motion of the lever 7 about its center 8. One end of the arm 9 is pivotally secured to the central portion of the curved piece 10, i.e. flapper-like member 10 by fastener 9a as best shown in FIG. 8. The other end of the arm 9 is attached to the lever 7 on either side of its center 8 by the threaded pin 11. This pin 11 passes through one end of the arm 9 and is threaded into either of the holes 12 or 13 in the lever 7.

As shown in FIGS. 8 and 9 the bleed nozzle 14 is movably positioned to have its tip 15 in close proximity to the inner surface 16 of the curved piece 10. The nozzle 14 is secured to the pilot housing 17 by a pin 18 which is threaded into the housing 17. Pin 18 is sufficiently tight to effect a seal between the parts of nozzle 14 and pilot housing 17 while allowing nozzle 14 to pivot thereabout. This pin 18, as may be seen clearly in FIG. 2, is hollow and contains an orifice plug 19 in the lower portion thereof. This plug 19 is secured in the pin 18 by any suitable means such as a press fit. A plunger 20, having an orifice cleaning tip 21, is retained in the hollow portion of the pin 18 by a threaded collar 22. The collar 22 engages the shoulder 23 of the plunger 20 to prevent movement of the plunger out of the hollow portion of the pin 18. Engaging the lower side of the shoulder 23 is a washer 24, an O-ring 25 and another washer 26. These elements serve to form a seal to prevent pressure fluid from leaking out through the hollow portion of the pin 18. A spring 27 is contained in this hollow portion, engaging the shoulder 28 and the washer 26. Thus, it may be seen that by pressing on the outer end of the plunger 20, the orifice cleaning tip 21 of the plunger 20 will eject any dirt and debris from the orifice 29. Upon release of the plunger 20 the spring 27 will return the plunger 20 to its normal position. It should also be noted that holes 30 and 31 in the pin 18 serve to transmit any pressure fluid coming through orifice 29 to the interior of the bleed nozzle 14 and the upper diaphragm chamber 32. A sealing washer or gasket 33 is used to prevent loss of pressure fluid through the opening between the pin 18 and the inner surface of the nozzle 14.

The nozzle 14 is constructed of a hollow block 34 which receives the pin 18, a tubular member 35, an orifice piece 36 and a collar 37. The hollow block 34 has a hole 38 to receive the pin 18 and a hole 39 to transmit the pressure from the hole 30 in the pin 18 to the interior of the tubular member 35 which is secured to the block 34 as by welding in a position surrounding the hole 39. The orifice piece 36 has a longitudinal recess 40 running almost the entire length and terminating in an orifice 41 at the nozzle tip 15. The piece 36 is externally threaded and has a groove 42 for an O-ring 43 to prevent leakage of the pressure fluid transmitted through the hole 39 in the block 34 through the thread connection 44. The piece 36 is screwed into the tubular member 35 to allow longitudinal adjustment of the nozzle tip 15 in relation to the curved piece 10. The collar 37 is secured in position against the flange 45 of the orifice piece 36. The cylindrical portion of the collar 37 has a knurled portion 46 and a calibrated or graduated portion 47. This calibrated portion 47 cooperates with line 35a running the length on the uppermost portion of the tubular member 35 to allow setting of the position of the nozzle tip 15 in relation to the curved piece 10. It should be noted that the pin 18 is tightened sufficiently to prevent leakage and still allow the bleed nozzle 14 to rotate thereabout.

A pointer 47a is secured to the hollow block 34, passes under the tubular member 35, extends upwardly allowing the tip 15 to pass through the hole 47b and terminates in a wedge-shaped pointing element. A portion of the pointer 47a is indented upwardly to engage the knurled portion 46 of the collar 37 to provide a click stop and prevent changes in the setting because of vibrations or other external conditions.

Figure 3:
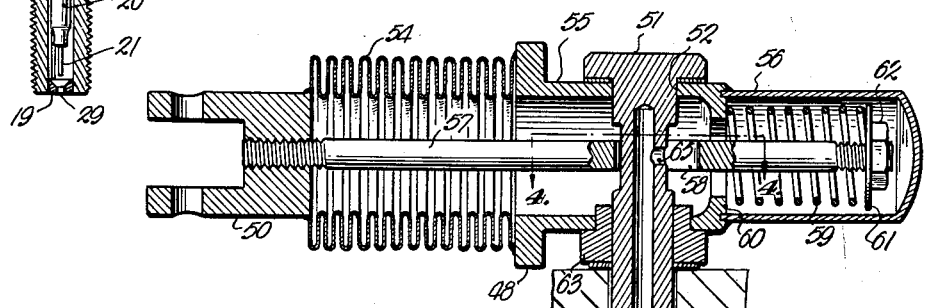
FIG. 3 is a sectional view of the bellows assembly taken along lines 3—3 in FIG. 9.
Figure 5:
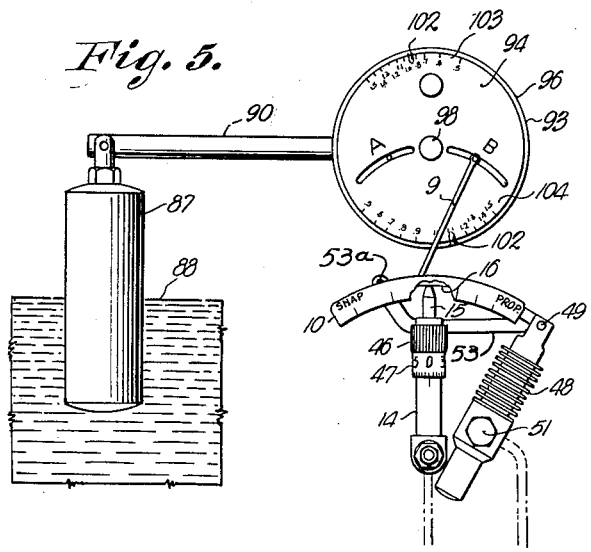
FIG. 5 is a partial schematic diagram of a liquid level controller constructed in accordance with the present invention.
Figure 4:
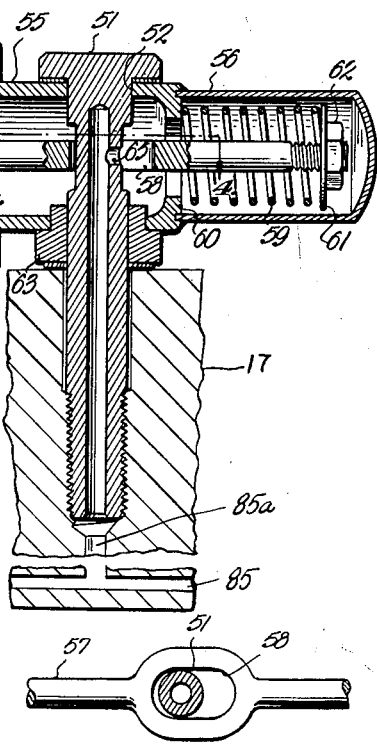
FIG. 4 is a partial internal view of the tie rod of the bellows assembly taken along lines 4—4 in FIG. 3.

The curved piece 10 is attached to the bellows assembly 48 at its extreme right hand end as shown in FIGS. 5 and 9 by a rivet 49 passing through the bellows extension 50 and the curved piece 10. The bellows assembly 48 is secured by a hollow pin 51 passing through the opening 52 and threaded into the pilot housing 17 as best shown in FIG. 3. The rivet 49 also passes through one end of an arm 53 securing it to the bellows extension 50. The other end of the arm 53 is secured to the pilot housing 17 with screw 53a or other suitable fastening to provide a pivotal connection between arm 53 and pilot housing 17. The length and positioning of this arm 53 controls the direction of the movement of the bellows assembly 48 and the curved piece 10. Over the short distances travelled by the bellows extension 50 this movement is substantially a straight line movement. The bellows assembly 48, as best shown in FIG. 3, is comprised of a bellows extension 50, a bellows 54, a main body 55 and a housing 56. The bellows 54 is soldered or otherwise secured to the bellows extension 50 and the main body 55. The housing 56 is also soldered or suitably secured to the main body 55. A retaining rod 57 being threaded at both ends and having a slotted central portion 58, as best shown in FIG. 4, to provide the necessary opening for the hollow pin 51 is screwed into the bellows extension 50. The other end of the retaining rod 57 passes through the spring 59 which is contained in the housing 56 between the shoulder 60 on the main body 55 and the washer 61. A nut 62 is tightened onto the retaining rod 57 to hold the washer 61 and the spring 59 in proper position. The main body 55 of the bellows assembly 48 contains a bushing 63 through which the pin 51 passes. The under surface of this bushing 63 acts to give a contact surface with the housing 17 on which the bellows assembly 48 rests. In operation pressure is transmitted from the lower diaphragm chamber 64 through the hollow pin 51 and the hole 65 drilled in the pin 51 into the interior of the bellows assembly 48 causing movement of the bellows extension 50 and the curved piece 10. It should be also noted that the movement of the bellows assembly 48 is limited by the length of the opening 58 in the retaining rod 57. This movement is stopped when the hollow pin 51 is contacted by the end of the opening 58. Thus, any limit may be placed on the movement of the bellows assembly 48 by varying the effective length of the opening 58 and its position relative to the hollow pin 51. This variation in the length of opening 58 may be accomplished by any suitable construction of rod 57, by replacing any particular rod 57 with a different rod 57 having a specifically desired length of opening 58 or by using a different hollow pin 51 which has a desired diameter at the level of rod 57.

The pilot housing 17 contains three diaphragm chambers, an upper pilot pressure chamber 32, a lower control pressure chamber 64 and an intermediate exhaust chamber 66. Supply pressure enters the pilot housing 17 through the passageway 67 which is connected to the pressure gage 68, the orifice 29 in the pin 18 and to the spring loaded valve 69. The valve 69 consists of a hollow member 70 threaded into the housing 17, a ball 71 seating on the end of the hollow portion of the member 70, a rod 72 connecting the ball 71 to another ball 73 and a spring 74 urging the ball 71 into seated position with the member 70.

An upper diaphragm 75 and lower diaphragm 76 separate the three diaphragm chambers from each other. The two diaphragms 75 and 76 are secured by a bolt 77 which acts as a relief seat for the second ball 73 for relieving pressure in the lower diaphragm chamber 64 to the exhaust chamber 66. The diaphragms 75 and 76 are spaced the proper distance from each other by a spacer 78. The nut 79 retains and secures the assembly units on the bolt 77. The lower diaphragm 76 is installed on the housing 17 with a housing spacer 80 between it and the upper diaphragm 75 and housing cover 81 secures the upper diaphragm 75, the housing spacer 80 and the lower diaphragm 76 to the housing 17. The housing spacer 80 has a hole 82 for external venting of the exhaust chamber 66 between the two diaphragms 75 and 76. A spring 83 surrounds the hollow member 70 of the valve 69 seating on the surface 83a of the housing 17 in the diaphragm chamber 64 and extends upward into contact with the washer 84 which is secured to the underside of lower diaphragm 76. Thus, it may be seen that the spring 83 urges the lower diaphragm 76 and the bolt 77 out of seating engagement with the ball 73 to allow the chamber 64 to vent to the chamber 66.

A line 85 connects the lower diaphragm chamber 64 with the diaphragm control valve or other pressure actuated equipment (not shown) which would be used to control the fluid pressure within pipe 3. This line 85 is also connected by port 85a to allow the pressure within the chamber 64 to be exerted within the bellows assembly 48 and also to a gauge 86 which will read the pilot output pressure.

FIG. 5 is a schematic view of a liquid level controller in which the pilot housing and parts contained therein have been omitted since they are identical with that shown in FIG. 1. This main difference between these two devices is the means by which a movement indicative of the variation from the desired control point is transmitted to the curved piece 10. As shown diagrammatically, a float 87 rises and falls with the liquid level 88. The movement of the float 87 is transmitted to a torque tube assembly, as shown in FIG. 7, is composed of a rod 91 within a tube 92. Both the rod 91 and the tube 92 are connected at a right angle to the arm 90 at one end and the tube 92 is secured at the other end in such a manner to prevent rotation. The rod 91 is attached to a cam mechanism assembly 93 to transmit the movement in proportion to the liquid level 88 to the pressure controller 1, thereby regulating the liquid level 88 in the vessel by opening or closing the control valve.

The cam mechanism assembly 93 is composed of three plates, two outside plates 94 and 95 and a central cam plate 96, two cam followers 97, pin means 98 connecting the three cam plates and allowing the central cam plate 96 to rotate while holding the outside cam plates 94 and 95, a screw lock 99 to prevent slippage of the central cam plate 96 when properly set and a combination hollow bolt 100 and coupling 101 providing a fixed connection of the cam mechanism assembly 93 to the rod 91. Hollow bolt 100 is provided with a flat portion engaging outside cam plates 94 and 95 while allowing central cam plate 96 to rotate thereabout as best shown in FIG. 7.

The central cam plate 96 has two pointers 102 as shown in FIG. 5. Also the front plate 94 has upper and lower graduation scales 103 and 104 respectively which allow the setting of the cam mechanism assembly 93 prior to operation of the unit as a liquid level controller. The graduation on scales 103 and 104 are numbered to allow pointers 102 to indicate the specific gravity of the liquid whose level is being controlled by the device of the present invention. Thus, by adjusting pointer 102 to indicate the specific gravity of the liquid whose level is being controlled the presetting of the gravity setting is accomplished. It should also be noted that there are two cam followers 97 giving two positions "A" and "B" to which the arm 9 may be secured. When the arm 9 is secured in the position "A," the upper scale 103 should be used in presetting a gravity setting and the lower scale 104 should be used when the arm 9 is in position "B." The function of the cam mechanism assembly 93 is to change the radius of the lever arms to which the curved piece 10 is connected by the arm 9. Thus it may be seen that with liquids of high specific gravity, the torque transmitted into movement by the rod 91 will be great and therefore will not need to be amplified by the cam mechanism assembly 93. On the other hand, liquids having a low specific gravity will not cause excessive movements of the float 87 and therefore would need to be amplified to allow accurate control.

The same basic pilot structure may therefore be used in a pressure controller or a liquid level controller. It may also be used in temperature controllers and flow controllers. A temperature controller would be similar to the pressure controller shown in FIG. 1. A Bourdon tube used with a closed system or bulb would be exposed to heat so that the movement of the Bourdon tube would be a measure of the temperature of the system. Another controller, a flow controller, may be constructed similar to FIG. 5 except that the flow controller would utilize a combination double differential (opposed) bellows to transmit a rotary motion to the controller which would be proportional to the flow. The bellows would be exposed to the different pressures upstream and downstream of a metering orifice, the ratio of these pressures being an indication of the rate of flow, therefore a movement in proportion of these pressures could be used in controlling a flow.

In operation, the pressure controller shown in FIGS. 1 and 9 and the liquid level controller shown in FIG. 5 are almost identical except for the means of sensing the media to be controlled and the means transmitting a motion to the controller which is indicative of the variation from a desired control point. This movement is transmitted by the arm 9 to the curved piece 10. Assuming in a pressure controller that air or gas is supplied through line 67 at the proper pressure and that the pressure in line 3 is being controlled by a diaphragm valve which when closed will allow the pressure to rise and when open will allow the pressure to fall, simulating a back pressure regulator. If this valve is spring loaded to open, then the arm 9 should be connected to the hole 12 by the screw 11, but if the diaphragm control valve is spring loaded tending to close, then the arm 9 should be connected to the hole 13. Therefore, provision has been made for using the present invention with any type of diaphragm motor valve. Thus, it may be seen that an increased pressure will be sensed by the Bourdon tubing 2 causing a movement which will move the curved piece 10 closer to the bleed nozzle 14. This will restrict the flow from the bleed nozzle and since at full flow it is just large enough to exhaust any pressure build-up in diaphragm chamber 32 this restriction will cause pressure to build up in diaphragm chamber 32. This pressure build-up will move diaphragms 75 and 76 to seat the exhaust ball 73 in the seat of the bolt 77 and then by overcoming the additional force of the spring 74, the valve 69 will open allowing pressure in diaphragm chamber 64, the line 85, the bellows assembly 48 and the diaphragm chamber of the control valve. The control valve is opened allowing additional flow so that the controlled pressure returns to the desired control point. The increase of pressure in the bellows assembly 48 anticipates this and causes the curved piece to move a little away from the bleed nozzle 14 assuming it is in a proportioning position. This action is generally termed negative feed back. Thus, with bleed nozzle set in "snap" position the positive feed back provided by bellows assembly 48 will cause any valve which is being controlled to always be fully open, fully closed or traveling from one position to the other in a fast or snap action. This is accomplished since the positive feed back of bellows assembly will accentuate rather than modify the movement of curved piece 10 with respect to bleed nozzle 14. With bleed nozzle 14 in proportioning position bellows assembly 48 provides a negative feed back which will modify the movements of curved piece 10. If the bleed nozzle 14 is set for snap action (control valve snaps to either full opened or full closed position), the movement of the curved piece 10 caused by the added pressure in the bellows assembly 48 will merely tighten the curved piece on the nozzle tip orifice 41 causing additional pressure build-up in the diaphragm chamber 32 and resulting in a complete opening of the diaphragm control valve. This action of the bellows assembly 48 is generally termed positive feedback. Thus, with bleed nozzle set in "snap" position the positive feedback provided by bellows assembly 48 will cause any valve which is being controlled to always be fully open, fully closed or traveling from one position to the other in a fast or snap action. This is accomplished since the positive feedback of bellows assembly will accentuate rather than modify the movement of curved piece 10 with respect to bleed nozzle 14. With bleed nozzle 14 in proportioning position bellows assembly 48 provides a negative feedback which will modify the movements of curved piece 10. The pressure in the diaphragm chamber 64 resulting from the opening of the valve 69 will tend to cause the diaphragms 75 and 76 to return to their original positions. It should be noted that the effective area exposed to the pressure of diaphragm chamber 64 is less than the effective area exposed to the pressure of the diaphragm chamber 32. This difference in effective area allows the pressure in the diaphragm chamber 32 to overcome the pressure in the diaphragm chamber 64 and also the force of springs 74 and 83.

The return of the controlled pressure to the desired control point is sensed by the Bourdon tube 2 and translated into a motion which causes the curved piece 10 to be moved away from the bleed nozzle 14. This removal of the restriction will allow the chamber 32 to be exhausted, allowing the diaphragms 75 and 76 to move away from the exhaust ball 73 allowing the pressure in line 85, bellows assembly 48, diaphragm chamber 64 and the diaphragm chamber of the control valve to exhaust to atmosphere through the bolt 77 and the hole 82. Thus, from the foregoing description of the operation of this device as a pressure controller it may be seen that a proportional action may be attained where the position of the diaphragm valve controlling the pressure will remain partially open at all times, assuming that there is sufficient flow. Also, as explained previously, the control valve may be made snap acting.

This controller would operate in a very similar manner when used as a liquid level controller. Thus, if the level to be controlled were to rise above the desired control level the float 87 would transmit this rise to the cam mechanism assembly 93 through the torque tube assembly 89 as previously described. This would cause a movement of the curved piece 10 away from the bleed nozzle 14 causing pressure to be transmitted through the pilot mechanism to the diaphragm chamber of the control valve which would cause the valve to open, allowing liquid to flow from the vessel, thus lowering the level to the desired control level. Similarly when the level in the vessel is below the desired control point, the controller would sense this and cause the diaphragm control valve to close. Thus, the level of a liquid in a vessel may be controlled to a particular level or to a range of levels within certain predetermined limits.

This application is a divisional application of my copending application Serial No. 483,154 filed January 20, 1955, now U.S. Patent No. 2,984,260 issued May 16, 1961, and is filed in response to the requirement for restriction of the original application.

What I claim and desire to secure by Letters Patent is:
1. A device comprising,
   a pair of circular plates,
   a bolt having a flat along its shank,
   said plates mounted on said bolt engaging the flat portion of the shank of said bolt,
   a third circular plate positioned on said bolt between said pair of plates, said third circular plate being free to rotate around said bolt, said pair of circular plates having slots curving outwardly and downwardly from the point near the center of said plates and terminating short of the outer periphery of said plates, said third plate having a pair of spiral slots, and a pair of cam followers, each of said pair of cam followers extending through one slot in each of said pair of circular plates and through one of the slots in said third plate.

2. Invention according to claim 1 wherein, said bolt is provided to receive a rotatable shaft, and said cam followers are made to connect to a linkage whereby the rotation transmitted to said bolt will move a linkage connecting to one of said cam followers in an amount proportional to the position of said cam follower relative to the center of said circular plates, said relative position being preset by movement of said third circular plate relative to said pair of circular plates.

3. Invention according to claim 1 including, means extending through said circular plates to clamp said third circular plate with respect to said pair of circular plates.

4. In an apparatus having means containing a stream of fluid having a liquid level to be controlled, and a device for automatic control of said liquid level comprising a responsive member adapted for movement in accordance with said liquid level, a control valve, a valve actuated by pressure and adapted to control said liquid level supply means providing actuating pressure control fluid, a bleed nozzle permitting regulated discharge of said pressure control fluid, a regulating member for controlling escape of said pressure control fluid from said bleed nozzle, diaphragm means responsive to pressure conditions in said bleed nozzle to release pressure to said control valve, means transmitting such released pressure for actuation of said control valve to restore the liquid level to the desired value and means for shutting off and exhausting pressure control fluid from said control valve when the desired liquid level has been restored; the improvement comprising connecting means adapted to transmit the movement of said responsive member to said regulating member for movement of said regulating member in accordance with the control characteristics of said liquid level, said connecting means including:

an adjustable lever means and cam means adapted to be manually actuated to thereby adjust the effective length of said lever means in accordance with the specific gravity of the liquid to provide sufficient movement of said regulating member when the movement of said responsive member is changed by a variation in specific gravity of liquid.

5. In an apparatus having means containing a stream of fluid having a liquid level to be controlled, and a device for automatic control of said liquid level comprising a responsive member adapted for movement in accordance with said liquid level, a control valve, a valve actuated by pressure and adapted to control said liquid level supply means providing actuating pressure control fluid, a bleed nozzle permitting regulated discharge of said pressure control fluid, a regulating member for controlling escape of said pressure control fluid from said bleed nozzle, diaphragm means responsive to pressure conditions in said bleed nozzle to release pressure to said control valve, means transmitting such released pressure for actuation of said control valve to restore the liquid level to the desired value and means for shutting off and exhausting pressure control fluid from said control valve when the desired liquid level has been restored; the improvement comprising connecting means adapted to transmit the movement of said responsive member to said regulating member for movement of said regulating member in accordance with the control characteristics of said liquid level, said connecting means including:

lever means and means comprising superposed plates having slots and pins adjustable in said slots and being adapted to regulate said lever means in accordance with the specific gravity of the liquid to provide sufficient movement of said regulating member when the movement of said responsive member is changed by a variation in specific gravity of liquid.

6. In an apparatus having a control device for controlling the level of a liquid within a container wherein said liquid level is sensed by a float and transmitted through a rod restrained by a torque tube to control the flapper associated with a bleed nozzle; the improvement comprising an adjustable lever arm device adapted to transmit the movement of said float to said flapper, said device comprising:

a coupling adapted to be connected to said rod, a pair of cam plates connected to said coupling, an inner cam plate positioned between said pair of cam plates and mounted on said coupling to rotate with respect to said pair of cam plates, a pair of mating slots in each of said pair of cam plates, a pair of slots in said inner cam plate, a pair of cam followers, each of said cam followers being positioned in one slot in each of said cam plates whereby rotation of said inner cam plate in one direction will cause both of said cam followers to move in a direction away from the center of said cam plates and rotation of said inner cam plate in the opposite direction will cause both of said cam followers to move in a direction toward the center of said cam plates, means adapted to connect one of said cam followers to said flapper and, means extending through said cam plates to lock said inner cam plate with respect to said pair of cam plates.

7. An adjustable lever arm device as described in claim 6 wherein said inner cam plate is provided with a pointer and the outer face of the external cam plate of said pair of cam plates is provided with markings indicating the position of the setting of said inner cam plate desired in accordance with the specific gravity of liquid within said container.

8. In an apparatus having a control device for controlling the level of a liquid within a container wherein said liquid level is sensed by a level responsive device and transmitted to a member which controls the escape of control fluid from a bleed nozzle; the improvement comprising a mechanism adapted to control the position of said member in relation to said bleed nozzle, said mechanism comprising:

selectively adjustable lever means, and cam means adapted to preset said lever means at a desired length in accordance with the specific gravity of the liquid whose level is being controlled by said control device.

References Cited in the file of this patent

UNITED STATES PATENTS

| | | |
|---|---|---|
| 2,356,970 | Brockett | Aug. 29, 1944 |
| 2,737,973 | Kimmell | Mar. 13, 1956 |
| 2,873,755 | Whitehead | Feb. 17, 1959 |
| 2,925,733 | Huston | Feb. 23, 1960 |